United States Patent [19]
Kosmoski et al.

[11] Patent Number: 5,947,434
[45] Date of Patent: *Sep. 7, 1999

[54] COMBINATION SPEAKER HOUSING AND VIDEO MONITOR BRACKET

[75] Inventors: Jeffrey P. Kosmoski; David Knaub, both of Portland, Oreg.

[73] Assignee: Labtec Enterprises, Inc., Vancouver, Wash.

[ * ] Notice: This patent is subject to a terminal disclaimer.

[21] Appl. No.: 09/001,714

[22] Filed: Dec. 31, 1997

Related U.S. Application Data

[63] Continuation of application No. 08/588,367, Jan. 18, 1996, Pat. No. 5,833,186.

[51] Int. Cl.$^6$ ........................................ A47K 5/00
[52] U.S. Cl. ........................ 248/298.1; 248/221.11; 248/687; 381/205
[58] Field of Search ................ 248/221.11, 687, 248/122.12, 298.1, 334.4, 221.12, 442.2, 633; 381/705, 87, 88, 188; 403/316, 393, 353; 5/299

[56] References Cited

U.S. PATENT DOCUMENTS

| | | | |
|---|---|---|---|
| 1,673,704 | 6/1928 | Palmer et al. | 248/298.1 |
| 3,392,848 | 7/1968 | McConnell et al. | 248/221.12 |
| 3,976,162 | 8/1976 | Cummings | 381/205 |
| 4,231,378 | 11/1980 | Stevens | 131/170 R |
| 4,475,226 | 10/1984 | Greenberg | 381/205 |
| 4,619,429 | 10/1986 | Mazza | 248/442.2 |
| 4,993,074 | 2/1991 | Carroll | 381/205 |
| 5,282,251 | 1/1994 | Petersen | 381/205 |

*Primary Examiner*—Leslie A. Braun
*Assistant Examiner*—Willie Berry, Jr.
*Attorney, Agent, or Firm*—Ipsolon LLP

[57] ABSTRACT

A combination loudspeaker housing and bracket is disclosed which is universally adaptable to any size or shape of a video monitor, and which mounts speakers outboard of the monitor.

17 Claims, 4 Drawing Sheets

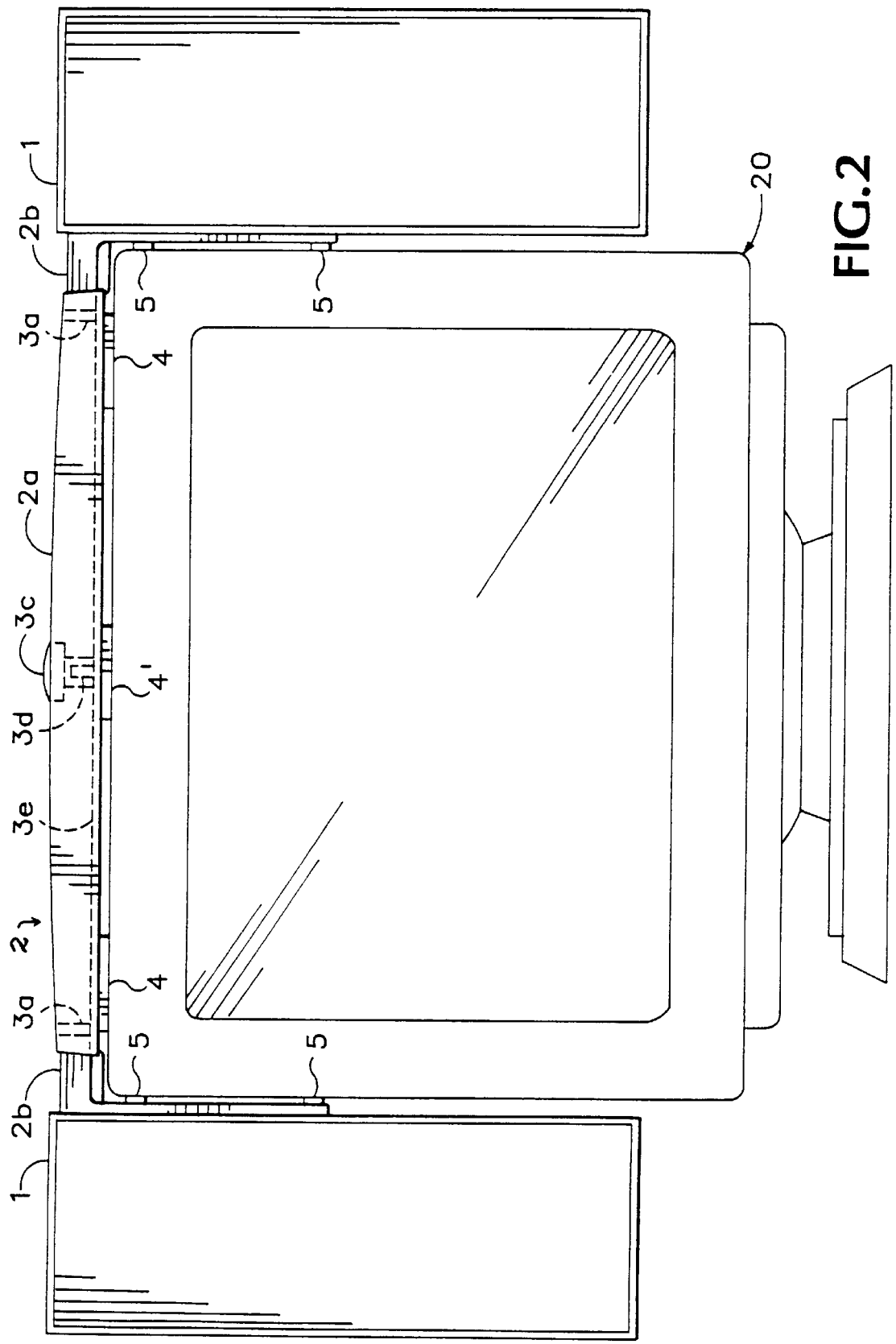

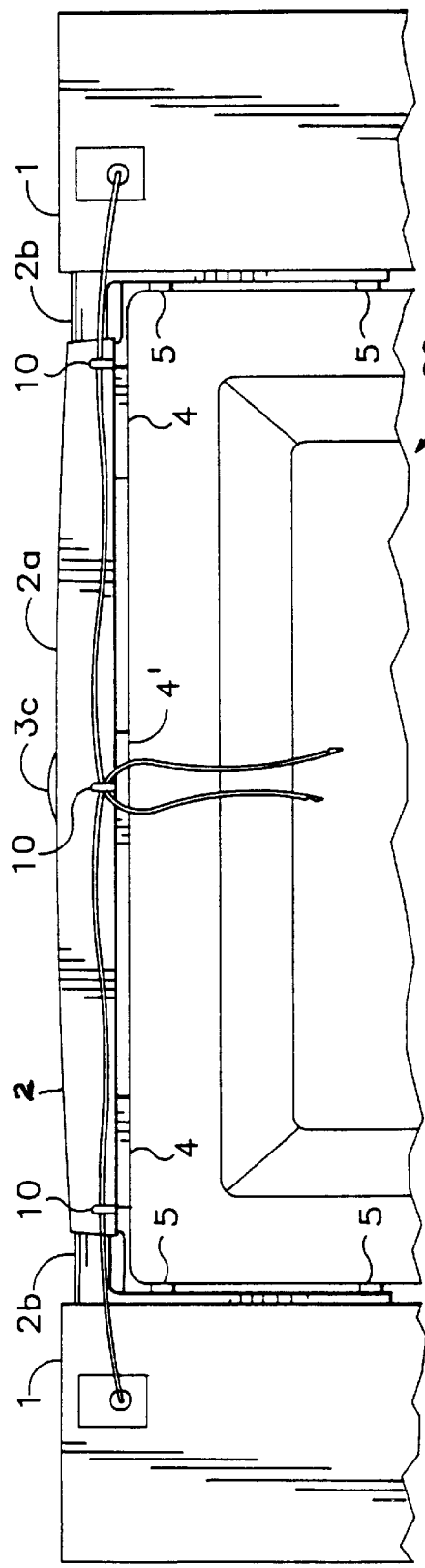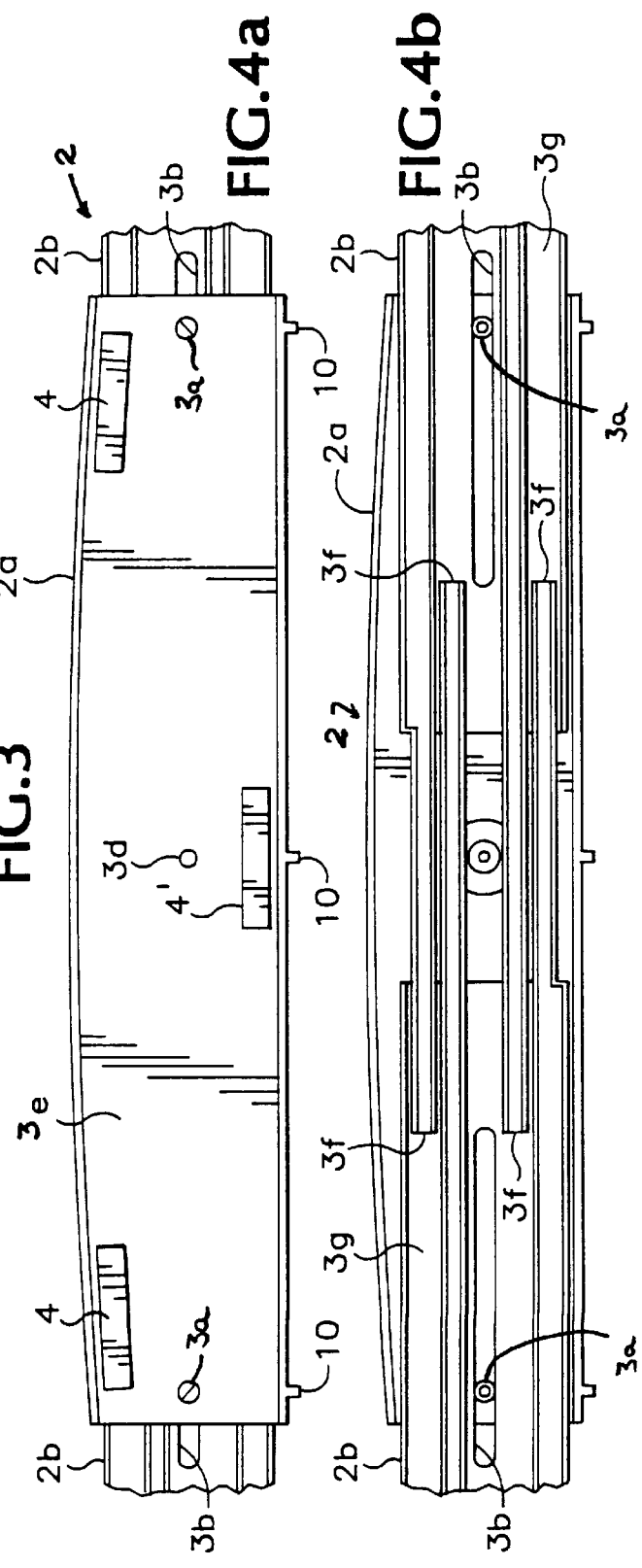

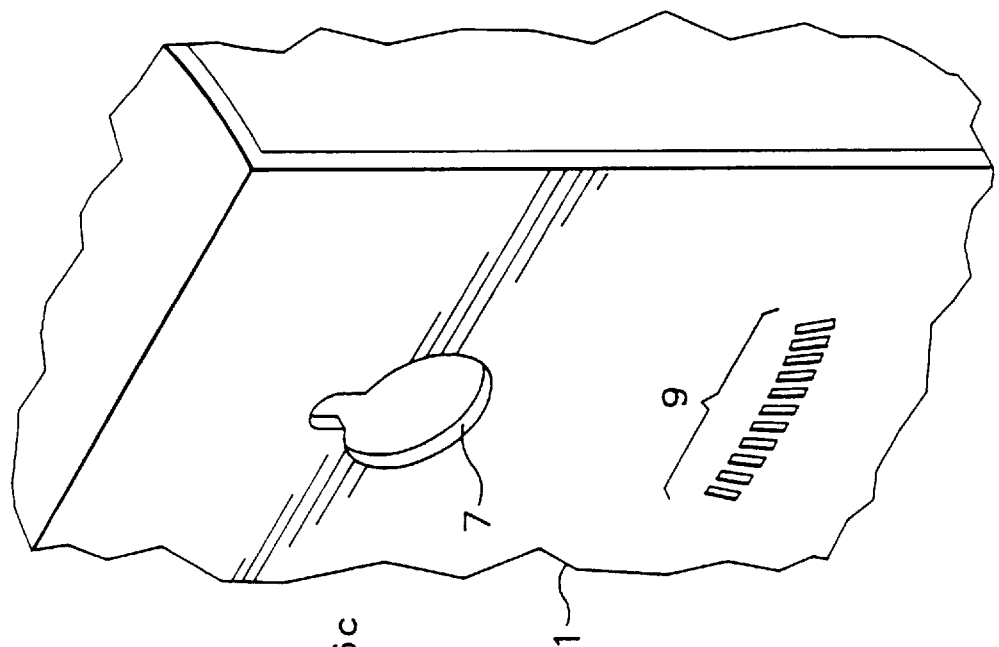
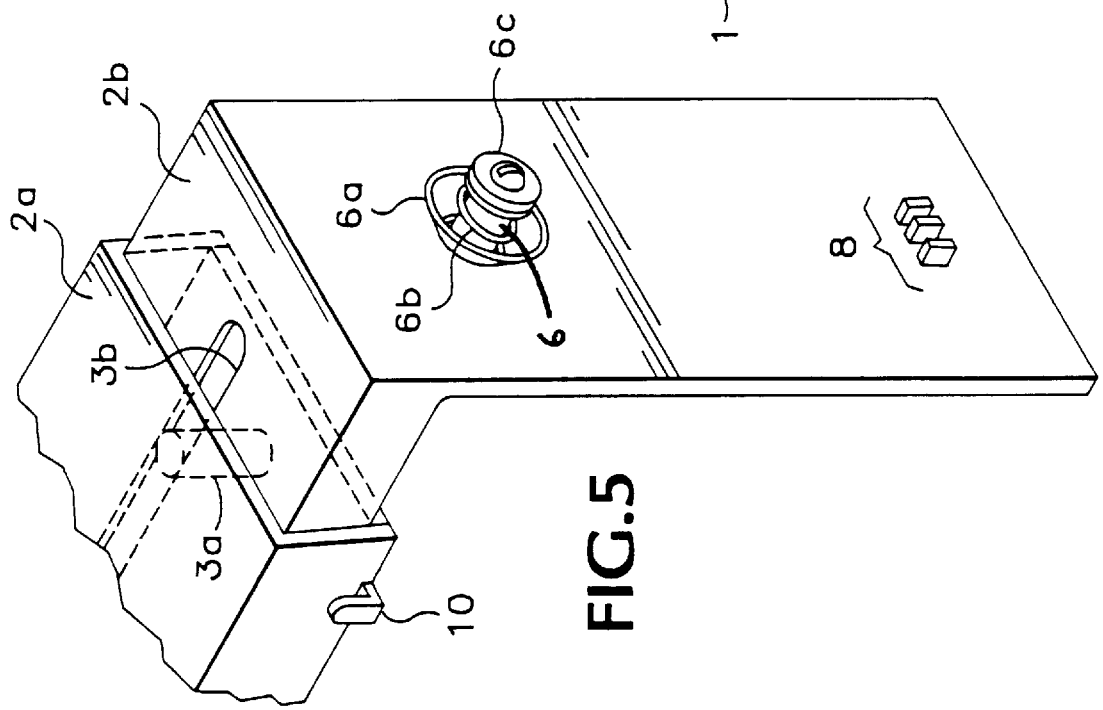

COMBINATION SPEAKER HOUSING AND VIDEO MONITOR BRACKET

This application is a continuation of Ser. No. 08/588,367 filed Jan. 18, 1996 now U.S. Pat. No. 5,833,186.

BACKGROUND OF THE INVENTION

This invention relates to improvements in computer-related equipment.

With the advent of high quality stereophonic audio to accompany the video displays on television screens and computer monitors, there has developed a need for a convenient and universally adjustable means for mounting loudspeakers in close proximity to television and monitor screens. The present invention, which is summarized and described in detail below, meets this need.

SUMMARY OF THE INVENTION

The invention comprises an adjustable and universally fitting bracket for mounting loudspeakers outboard of virtually any sized or shaped video monitor, in combination with a loudspeaker housing adapted for adjustable angular engagement with the bracket.

BRIEF DESCRIPTION OF THE DRAWINGS

FIG. 2 is a front view of the present invention showing loudspeaker housings mounted outboard of a video monitor.

FIG. 3 is a rear view of the present invention showing loudspeaker housings mounted outboard of a video monitor.

FIGS. 4a and 4b are views of the underside of the bracket of the present invention.

FIG. 5 is a perspective view of one wall of an exemplary loudspeaker housing showing means therein adapted for engagement with the bracket of the present invention.

FIG. 6 is a perspective view of a portion of the bracket of the present invention showing a means thereon adapted for engagement with the loudspeaker housing.

DESCRIPTION OF THE PREFERRED EMBODIMENTS

Figure 1:
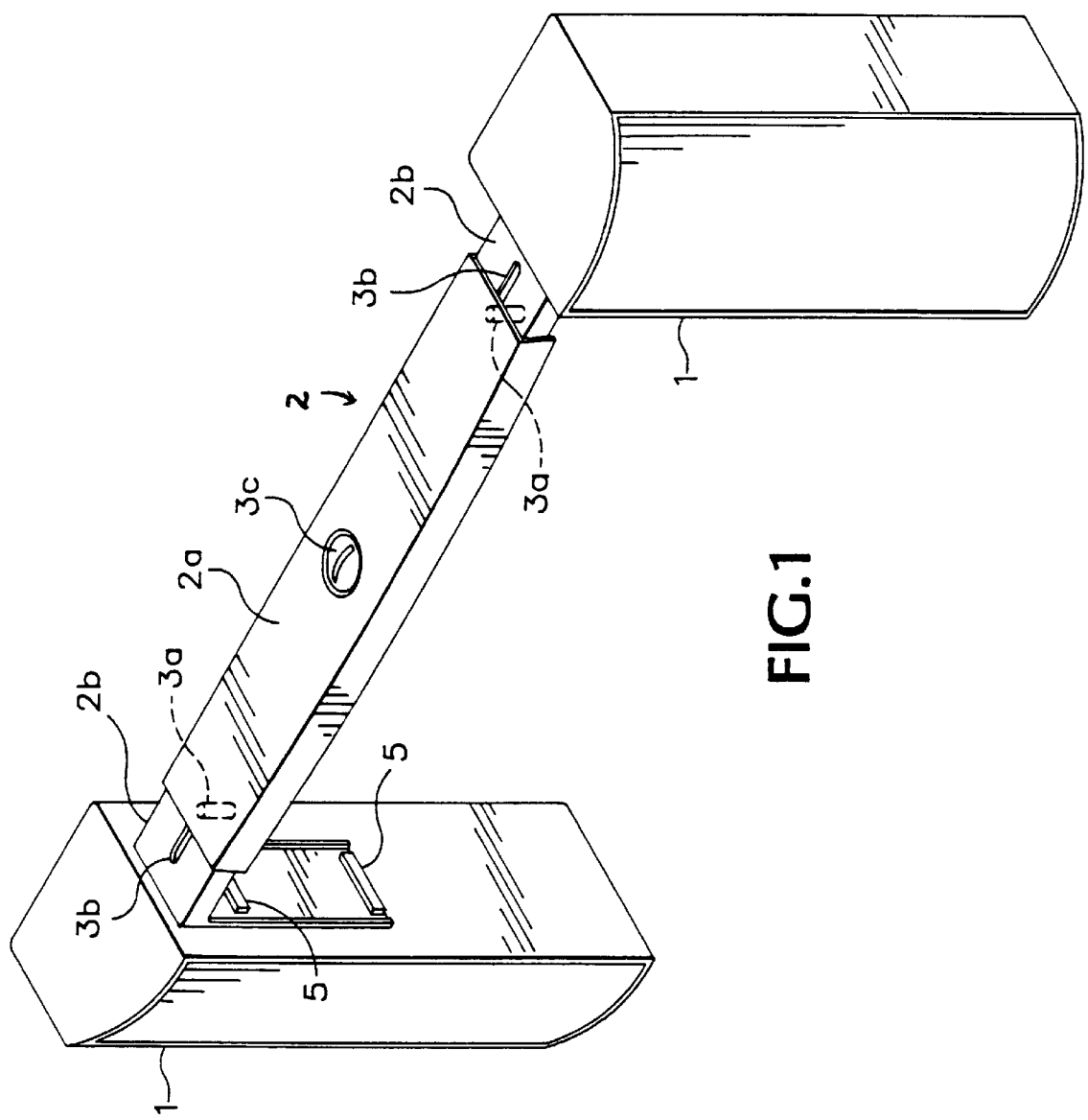
FIG. 1 is a perspective view of an exemplary combination speaker housing and mounting bracket of the present invention.

Referring to the drawings, wherein like numerals refer to the same elements, FIG. 1 shows speaker housings 1 attached to a bracket 2 of the present invention, comprising a bridging member 2a having slidably adjustable L-shaped extensions 2b which are slidable with respect to each other and with respect to bridging member 2a by means of slot-engaging guides 3a that engage elongate slots 3b. L-shaped extensions 2b are preferably fabricated with ribbed rails 3f that slidably engage corresponding channels 3g, those two elements enabling proper, smooth and secure alignment of the extensions 2b with respect to each other.

The extensions 2b are held in fixed relation to each other by threaded female nut 3c which engages threaded bracket plate pin 3d to pull bracket plate 3e upwardly to impinge upon the extensions, best seen in the top portion of FIG. 2.

FIG. 2 is a frontal view of a computer monitor 20 showing bracket 2 with speaker housings 1 attached outrigger style to L-shaped extensions 2b, the bracket engaging the top and sides of the monitor via resilient pads 4, 4' and 5.

FIG. 3 is a rear view of the bracket and speakers mounted on the monitor, and showing speaker lead wire management harness 10 on the back side of bracket 2.

FIG. 4a is a view of the underside of the bracket 2 showing resilient pads 4, 4', and 5 in a spaced and balanced relationship to each other.

FIG. 4b is a view of the underside of the bracket 2 with the bracket plate 3e removed to show the arrangement of the rails 3f, channels 3g, guides 3a and lots 3b.

FIGS. 5 and 6 show the mating relationship between the housing 1 and bracket extension 2b, whereby post 6 engages elongate slotted hole 7 and pegs 8 engage corresponding slots 9, both pegs and slots being radially oriented in relation to post 6 and elongate slotted hole 7, respectively. An annual collar-like keeper 6a surrounds post 6 and is urged toward a base of the post by spring 6b, which in turn is secured to the post by a screw and flange combination 6c.

Because the L-shaped extensions 2b of the bracket are horizontally slidable with respect to each other, the bracket is universally adjustable to fit virtually any width TV set or video monitor. Similarly, the provision of at least one resilient pad on the underside of the bridging member 2a assures a snug, vibration-free fit of the bracket to the top of the TV set or monitor that automatically conforms to the curvature of the top of the TV set or monitor. The provision of the least one resilient pad on the inside of each downwardly extending leg of the L-shaped extensions 2b further assures a snug and vibration-free fit of the bracket to the TV set or monitor. Once the width of the bracket is slidably adjusted so that downwardly extending legs of L-shaped extensions 2b engage the sides of the TV set or monitor, threaded female nut 3c is tightened to engage threaded bracket plate pin 3d so as to snug bracket plate 3e up into secure contact with ribbed rails 3f and channels 3g of the L-shaped extensions, thereby fixing the width of the bracket to the desired size.

A loudspeaker in speaker housing 1 is secured to the bracket by first guiding the larger portion of elongate slotted hole 7 over post 6 and keeper 6a, then urging the smaller or slotted portion of elongate slotted hole 7 at generally right angles to post 6; the slight taper of keeper 6a guides the slotted part of elongate hole 7 to the base of post 6, while spring 6b yields sufficiently to allow locking engagement between the slot and the base of post 6, with keeper 6a being biased against the inside wall of speaker housing 1. Speaker housing 1 is then pivoted about post 6 until slotted holes 9 are in the desired alignment with pegs 8, whereupon holes 9 and pegs 8 are engaged.

To allow for an adjustable orientation of the front of the loudspeaker(s) in relation to the plane of the bridging member (determined by the slope of the top of the TV set or monitor), pegs 8 and slots 9 are preferably in a radial array relative to post 6 and elongate hole 7, respectively. Such an orientation of pegs 8 and slots 9 allows loudspeakers in speaker housings 1 to be rotated incrementally on posts 6 to the desired plane so that the loudspeakers may be oriented in the same plane as the screen of the TV set or monitor, or at an angle with respect thereto, such as in a perfectly vertical plane.

The terms expressions which have been employed in the foregoing specification are used herein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. An apparatus for mounting loudspeaker housings onto a computer display device, comprising:

(a) two loudspeaker housings, each housing having an elongate recess defined in a housing wall and at least one receptacle spaced apart from the elongate recess; and (b) two L-shaped members, each member having a downwardly oriented extension and a lateral extension, the downwardly oriented extensions each being provided with a post and at least one peg spaced apart from the post, the post and the at least one peg being adapted for engagement with the elongate recess and the at least one receptacle of one housing, respectively, whereby the L-shaped members can be arranged on a monitor so that the lateral extensions are substantially horizontal and extend toward each other relative to the downwardly oriented extensions and each L-shaped member can support one loudspeaker housing on opposed sides of a video display device at a predetermined orientation.

2. The apparatus of claim 1 wherein each housing has a multiplicity of receptacles radially arranged in relation to the elongate recess and each L-shaped member has a multiplicity of pegs radially arranged in relation to the post.

3. The apparatus of claim 1 wherein the post of each L-shaped member has an annular keeper adapted for engagement within one respective elongate recess.

4. The apparatus of claim 1 wherein the annular keeper is spring-loaded so as to urge the keeper toward the base of the post.

5. The apparatus of claim 1 wherein the at least one receptacle of the housing and the at least one peg of the L-shaped member are rectilinear.

6. The apparatus of claim 1 wherein the L-shaped members are provided with at least one resilient pad for engaging the sides of a video monitor.

7. A combination of loudspeaker housings and brackets, comprising:

(c) two loudspeaker housings, each housing having a first coupler device and a first positioning device; and (d) two brackets, each bracket having a first leg and a second leg, the first legs each having a second coupler device selectively coupled to one respective first coupler device for coupling one loudspeaker housing to the first leg of one respective bracket and the first legs of each bracket having a second positioning device operable with the first positioning device to orient one respective loudspeaker housing relative to one respective bracket when the combination is mounted on a video display device.

8. The combination of claim 7 wherein the second coupler device is a post and the first coupler device is an aperture for receiving the post.

9. The combination of claim 7 wherein the first coupler device is a post and the second coupler device is an aperture for receiving the post.

10. The combination of claim 7 wherein the first positioning device is a peg and the second positioning device is a receptacle for receiving the peg.

11. The combination of claim 7 wherein the second positioning device is a peg and the first positioning device is a receptacle for receiving the peg.

12. The combination of claim 7 wherein the first coupler device is an aperture and the second coupler device is a post having a biased annular collar for urging the housing against the bracket when the housing is coupled to the bracket by the first and second coupler devices.

13. A multimedia loudspeaker support apparatus for locating a pair of loudspeakers onto a video display device, comprising:

(a) two brackets, each bracket having a conformal inner surface for mating with an outer surface of a video display device, and each bracket having an outer surface having a first coupler device and a first positioning device; and (b) two loudspeaker housings, each housing having a second coupler device for selectively coupling to one first coupler device of a respective bracket and each housing further having a second positioning device for engagement with one first positioning device for positioning the respective loudspeaker relative to a respective bracket.

14. The apparatus of claim 13 wherein the first coupler device comprises a post having a biased collar and the second coupler device comprises an aperture that receives the post and collar whereby the speaker housing is urged against the bracket.

15. The apparatus of claim 13 wherein the first coupler device comprises an aperture and the second coupler device comprises a post having a biased collar and the post and collar are received in the aperture so as the urge the speaker housing against the bracket.

16. The apparatus of claim 13 wherein the first positioning device comprises a peg and the second positioning device comprises a receptacle for receiving the peg so as to maintain one respective housing in a predetermined position relative to the respective bracket when the housing is coupled to the bracket.

17. The apparatus of claim 13 wherein the first coupler device comprises a post having a biased collar and the second coupler device comprises an aperture that receives the post and biased collar so as to urge the speaker housing against the bracket and wherein the first positioning device comprises a peg and the second positioning device comprises a receptacle for receiving the peg so as to maintain the housings in a predetermined position when the housings are coupled to the bracket.

* * * * *